MAGNETIC DATA STORE WITH RADIO-FREQUENCY NONDESTRUCTIVE READ-OUT

Filed July 30, 1964 4 Sheets-Sheet 1

INVENTOR.
RICHARD L. FUSSELL
BY Francis A. Varallo
AGENT

INVENTOR.
RICHARD L. FUSSELL
BY Francis A. Varallo
AGENT

INVENTOR
RICHARD L. FUSSELL
BY Francis A. Varallo
AGENT

INVENTOR.
RICHARD L. FUSSELL
BY Francis A. Varallo
AGENT

United States Patent Office 3,418,645

Patented Dec. 24, 1968

3,418,645

MAGNETIC DATA STORE WITH RADIO-FREQUENCY NONDESTRUCTIVE READ-OUT

Richard L. Fussell, Chester Springs, Pa., assignor to Burroughs Corporation, Detroit, Mich., a corporation of Delaware Filed July 30, 1964, Ser. No. 386,263

10 Claims. (Cl. 340—174)

ABSTRACT OF THE DISCLOSURE

The present disclosure describes a thin magnetic film data store in which the interrogation of the magnetic elements is accomplished by the application thereto of a single radio-frequency drive field. The output sense signals generated during interrogaton are at a frequency which is twice the interrogating drive field frequency, and convey the information stored in the elements as the relative phase, zero or 180 degrees, of the generated signals. Write-in or storage of information in the magnetic elements is accomplished either by applying to the elements a pair of radio-frequency fields in at least partial coincidence and oriented respectively transverse and parallel to the preferred axes of the elements, or by substituting for the dual radio-frequency fields, a transverse radio-frequency field and a parallel pulse field.

The present invention relates generally to thin films or layers of ferromagnetic material, and more specifically to the utilization of such material in providing improved nondestructive read-out memory elements and systems.

Thin ferromagnetic films have become increasingly prominent as computer storage elements. These films may be arranged to form data stores or memories of useful capacity and high reliability. As such, they offer a practical and economical solution to the continual problem of achieving higher speed memories.

Thin films of magnetic material may be produced which have a uniaxial anisotropy, or preferred (easy) axis or direction of magnetization in which substantially all of the magnetic domains lie parallel to this axis. After a relation has been arbitrarily established between the value of the bit of information to be stored and the sense of magnetization, the ferromagnetic material may be stably magnetized in either one of two possible states along the easy axis. To determine in which sense or state the material has been left magnetized, it is conventional to apply to the magnetic material a reading or read-out magnetizing field, in a reference sense. Conventional methods of reading out the information stored in the magnetic element leave the magnetic material in the reference state regardless of the state of the element prior to the reading operation, thereby destroying the information previously stored therein.

The present invention contemplates the use of thin magnetic films with their inherent advantages of reliability, compactness and high operational speed in a nondestructive read-out mode with its concomitant convenience and economy.

The thin magnetic films of the character described have been produced by evaporating a nickel-iron alloy, as for example 81% Ni, and 19% Fe, from a hot tungsten filament onto a heated thin glass substrate. By means of depositing through a mask the Ni-Fe vapor is caused to appear on the substrate in the form of spots, which are generally, although not necessarily, rectangular or circular in form. Another means of forming the spots is by a photo-etch process applied to a deposited continuous sheet of magnetic film. In order to minimize gas contamination of the deposit, the process is carried on in a vacuum, in the $10^{-5}$ torr region. During evaporation, the alloy is deposited at the rate of 10 to 15 Angstroms per second to a nominal thickness of 1200 Angstroms. A strong magnetic field in the order of 10 to 50 oersteds is applied uniformly in a direction parallel to the plane of the substrate during the evaporation process to cause the magnetic domains of the alloy to align in a preferred direction. The latter direction is parallel to the average axis of anisotropy. Other processes may also be employed for fabricating thin magnetic films. These processes include sputtering, vapor deposition (pyrolysis), and electrodeposition.

The magnetic characteristic of thin films in the preferred direction exhibits a substantially rectangular hysteresis loop. In a direction transverse to the easy direction, referred to as the hard direction, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_c$ and $H_k$ are obtained. $H_c$ is the coercive field value (coercivity) evaluated from the rectangular hysteresis loop in the easy direction; $H_k$ is the anisotropy field or saturation magnetization force in the hard direction.

A thin magnetic film possesses small dipole moments which, due to exchange energy and a single axis of anisotropy, are easily aligned and remain stable along a common axis. Thus, the dipole moments align to form a domain which may be represented by the moment M. M represents the magnitude and direction of the flux within a particular region or volume of the ferromagnetic material. The existing domain theory may be applied to thin films, which theory implies that domains or regions having their respective moments in opposite directions, may exist in a side-by-side arrangement. The boundary between two adjacent domains is called either a "Neel" or "Bloch" wall.

The quiescent position of M occurs where the resultant of torque-imposing forces is zero. This position is generally regarded as the point at which the total energy is a minimum. For the case of a single domain having no external applied field, the quiescent position of M is along the axis of anisotropy, but in either one of the two opposed directions. These directions may be designated respectively the (+) state and the (−) state. Any external field applied to M which has a component directed transverse to M will produce an unbalanced torque on M. Therefore M will rotate until its direction is such that the unbalanced torque becomes zero. The restoring forces of the film, which are necessarily overcome when M rotates, includes the anisotropy energy, magnetostatic energy, magnetostrictive energy and shape anisotropy.

In general, the application of a transverse field to a magnetic thin film produces a rotation of the film magnetization vector, M. The angle of rotation is given by $$\theta(t)=\sin^{-1}\frac{H_T(t)}{H_k}$$

where $H_T(t)$ is the applied hard direction of field, and $H_k$ is the anisotropy field parameter of the magnetic film element. The information stored by the element is sensed by a conductor adjacent thereto and positioned in such a manner that it responds to the easy or longitudinal direction component of the flux change. The magnitude of the voltage induced in the sense conductor is given by $$V=-MWT\sin\theta\frac{d\theta}{dt}$$

where M is the magnetic moment, W is the width and T is the thickness of the film.

In the well-known type of data store employing destructive read-out, the M vector is rotated through 90° to induce a maximum output signal on the sense line. The magnetic state of the film under this condition is unstable, and upon removal of the read or interrogate field, the film assumes a polydomain state, and the information previously stored therein is destroyed. A restore cycle, during which the interrogated information is rewritten into the memory element, may be used to prevent the loss of information.

Theoretically, assuming an ideal film element, if the rotation of the M vector is kept below 90°, a restore cycle would not be required. This is true because upon the termination of the interrogate field, M would revert to its initial position along the easy axis. This latter operation would be desirable from the standpoint of increased reliability and reduced memory access time. However, this operation is based upon the assumption that the film element behaves as a single domain at angles approaching 90°. In practice, degeneration to polydomain configurations occurs at much smaller angles due to such phenomena as skew and dispersion of the easy axis and demagnetizing fields. Experience indicates that to insure the coherent restoration of the M vector, the angle of rotation should be less than 20°. However, rotations on this order produce extremely small signals which would be difficult, if not impossible, to distinguish from associated switching noises.

film elements in which the functions of nondestructive

In accordance with the present invention there is provided a practical memory system utilizing thin magnetic read-out and alteration of information storage are easily and reliably accomplished.

The basis for the improved read-out operation stems from the use of a single radio-frequency (RF) drive field to interrogate the state of the element. The latter field, limited in amplitude to a level which will not permanently alter the stored information, causes the thin film magnetization vector to experience a sinusoidal angular displacement or rotation from the easy axis of magnetization. Such rotation of the M vector results in an RF sense signal having an amplitude dependent upon the interrogation field amplitude and frequency, as well as the flux available from the thin film element. Specifically, the significant sense signal is at a single frequency which is twice the interrogating drive frequency and conveys the information concerning the binary state of the thin film element as the relative phase, zero degrees or 180°, of the generated signal.

Because the nondestructive RF read-out is a narrow band, phase-script information, the resultant signal-to-noise ratio is several orders of magnitude superior to the noise associated with pulse operation, especially at nondestructive drive levels. Furthermore, the relatively small amplitude of the nondestructive sense signal is more than compensated by the efficiency with which narrow-band radio-frequency information can be amplified.

The read-out, being phase-script, is virtually immune to noise interference that is not in exact time synchronism with the read-out frequency because appropriate filtering can always recover the signal with no degradation of the phase-script information.

By virtue of the ability to transformer couple and physically tune circuits in both the drive and sense areas, optimum impedance matches may be obtained and sensitive areas may be isolated to further minimize noise coupling.

It is therefore a general object of the present invention to provide an improved magnetic data store.

Another object of the present invention is to provide a data store which utilizes thin films of ferromagnetic material and is capable of being interrogated repeatedly in a nondestructive manner.

A more specific object of the present invention is to provide a magnetic data store in which the interrogation drive field applied to the elements of said store is a radio-frequency field, and the read-out signal is the phase-script form of a single radio-frequency, which is twice the interrogation drive frequency.

These and other features of the invention will become more fully apparent from the following description of the annexed drawings, wherein.

Figure 1:
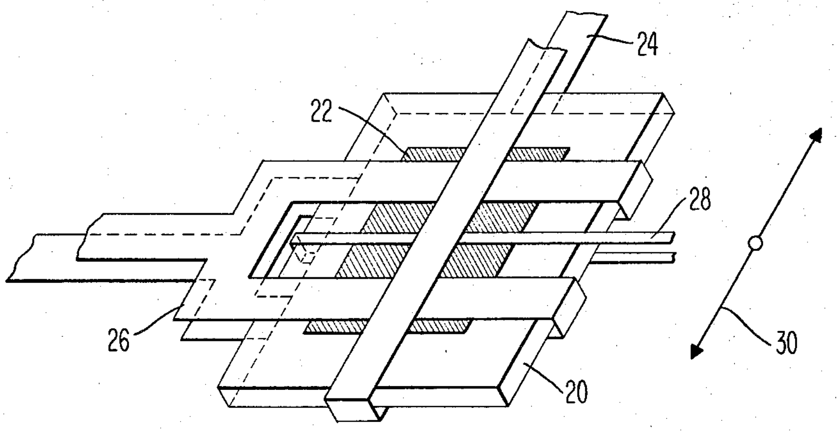
FIG. 1 is a pictorial representation of a ferromagnetic element in relation to a typical arrangement of conductors, as employed in the practice of the invention.

Referring to FIG. 1, there is represented a single unit of a ferromagnetic film element and the associated conductors needed to permit its employment in a data store suitable for use with conventional data handling, processing or computing devices. In FIG. 1 the single ferromagnetic film or layer element is depicted as being rectangular in form and is identified by reference numeral 22. In practice the actual geometric form of the element may be other than rectangular, and the invention should not be considered so limited. The conductors or portions of conductors which are intended to affect or be affected by the magnetization of the film element 22 are parallel to the film and in close proximity thereto. The preferred direction of magnetization of the film 22 is indicated by the arrows 30 and lies within the plane of the paper. The conductor 24, oriented parallel to the preferred axis of the film, is employed to generate a transverse drive field, referred to hereinafter as either $H_{T1}$ or $H_{T2}$, depending upon the desired strength of the field. The conductor 26, oriented perpendicular to the preferred direction of magnetization is split into two parallel conductors. Each of the latter conductors carries one-half of the current required to generate a parallel or longitudinal field, $H_L$. Lying between the split conductors is the sense conductor 28. A substrate 20 serves as a support for the other items.

In an actual operative embodiment of this invention, the following parameters were employed successfully. Each ferromagnetic film element was in the form of a rectangle, .04 inch by .08 inch, about 1200 Angstrom units thick, of nickel-iron alloy, formed by a photo-etch process subsequent to the vacuum deposition of the film upon a glass substrate. $H_c$, the coercivity of the magnetic material comprising the film element, was approximately 2.1 oersteds; $H_k$, the anisotropy field, 2.6 oersteds. The perpendicular drive conductors and the sense wire were etched on a printed circuit panel. For convenience the parallel drive and sense conductors were placed on one side of the panel and the transverse drive conductor on the other side. The peak value larger amplitude transverse drive field $H_{T1}$ was chosen to be about 2 oersteds (600 ma.); the smaller amplitude transverse field $H_{T2}$, about 0.25 oersted (75 ma.); the parallel drive field $H_L$, about 0.5 oersted (150 ma.). The currents in the various conductors are dependent upon the parameters of the magnetic material of which the storage element is composed, and their amplitude will also depend upon the width of the conductors and the spacing between themselves and the element. It should be emphasized that the foregoing dimensions and amplitudes given for the embodiment described, may vary according to the material, design or application, and are included solely for purposes of example.

Figure 2:
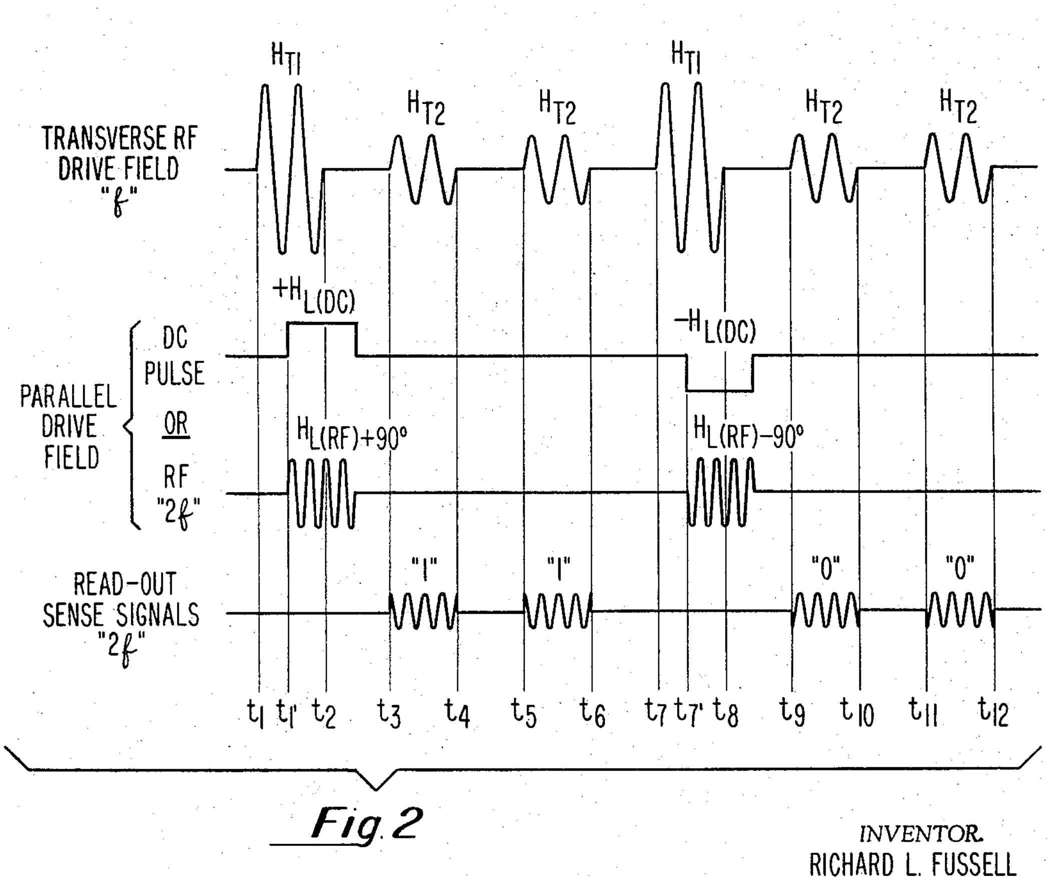
FIG. 2 is a diagram depicting the sequence of fields applied to a thin film element and the corresponding induced voltages generated in the sense conductor for writing in and reading out information representative of a binary "1" and a binary "0"
Figure 3:
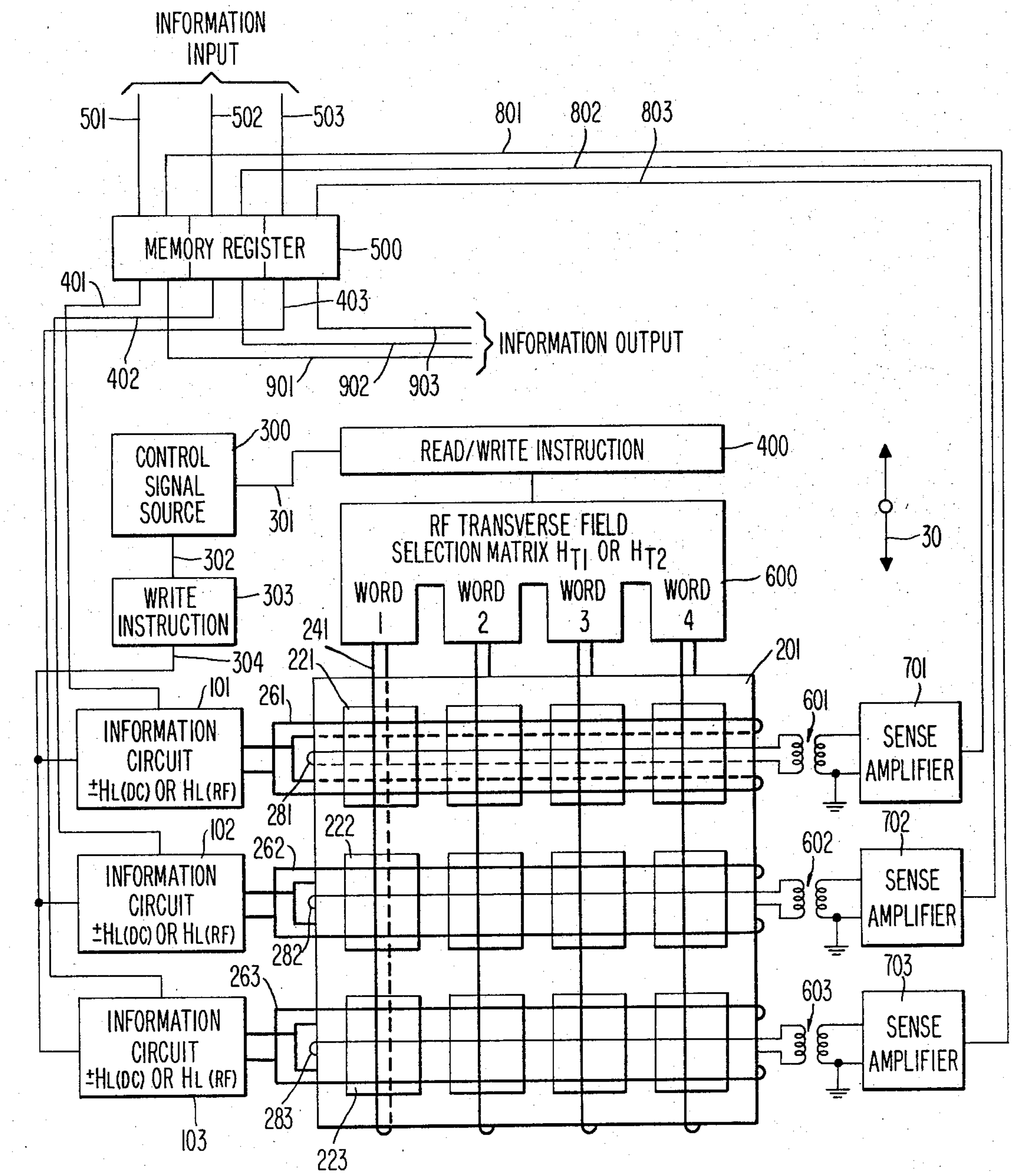
FIG. 3 is a representation of ferromagnetic storage elements with associated conductors and auxiliary equipment arranged for illustrating the invention.
Figure 4:
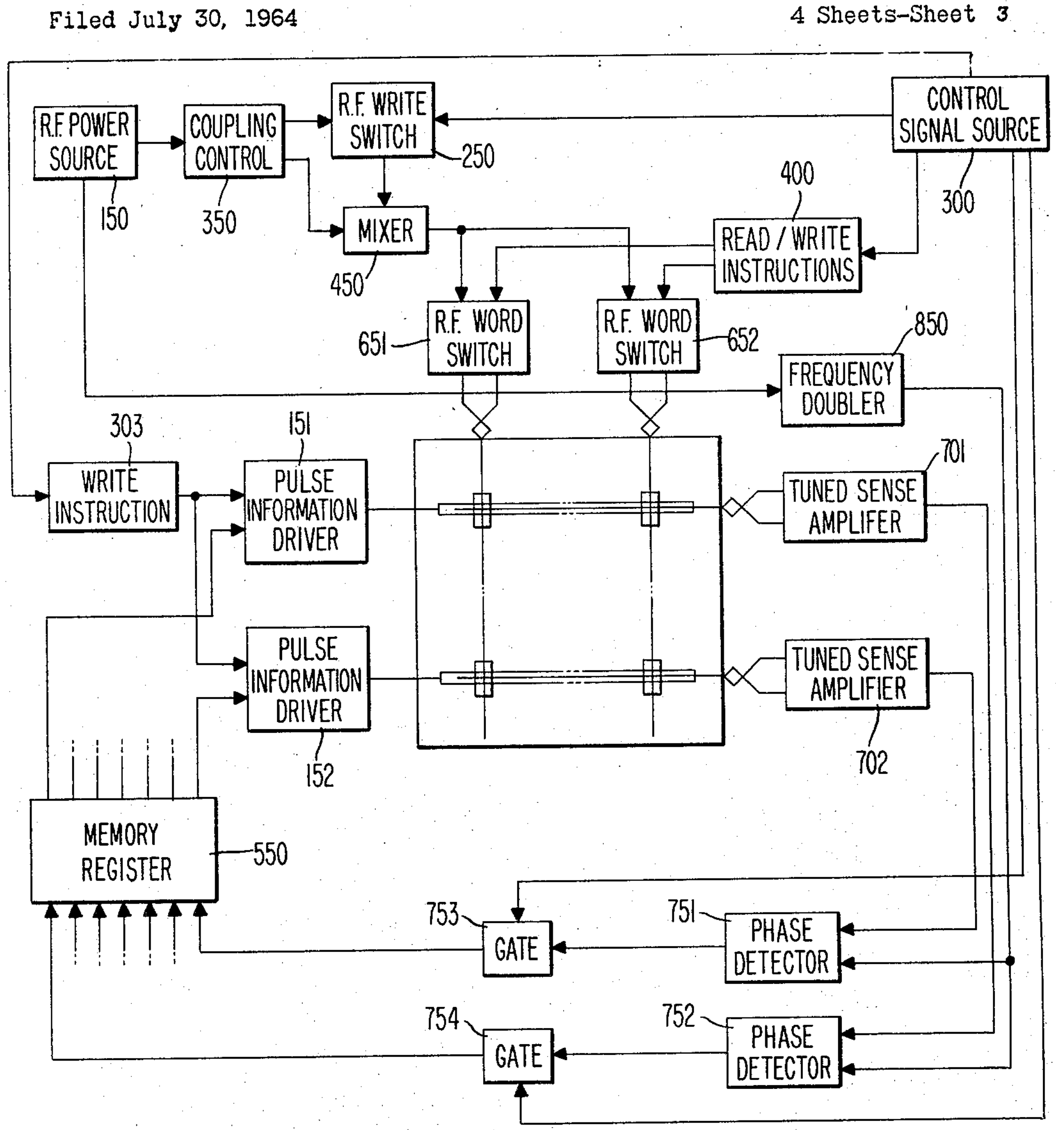
FIG. 4 is a representation of a specific organization of an RF nondestructive read-out data store in accordance with the invention.
Figure 5:
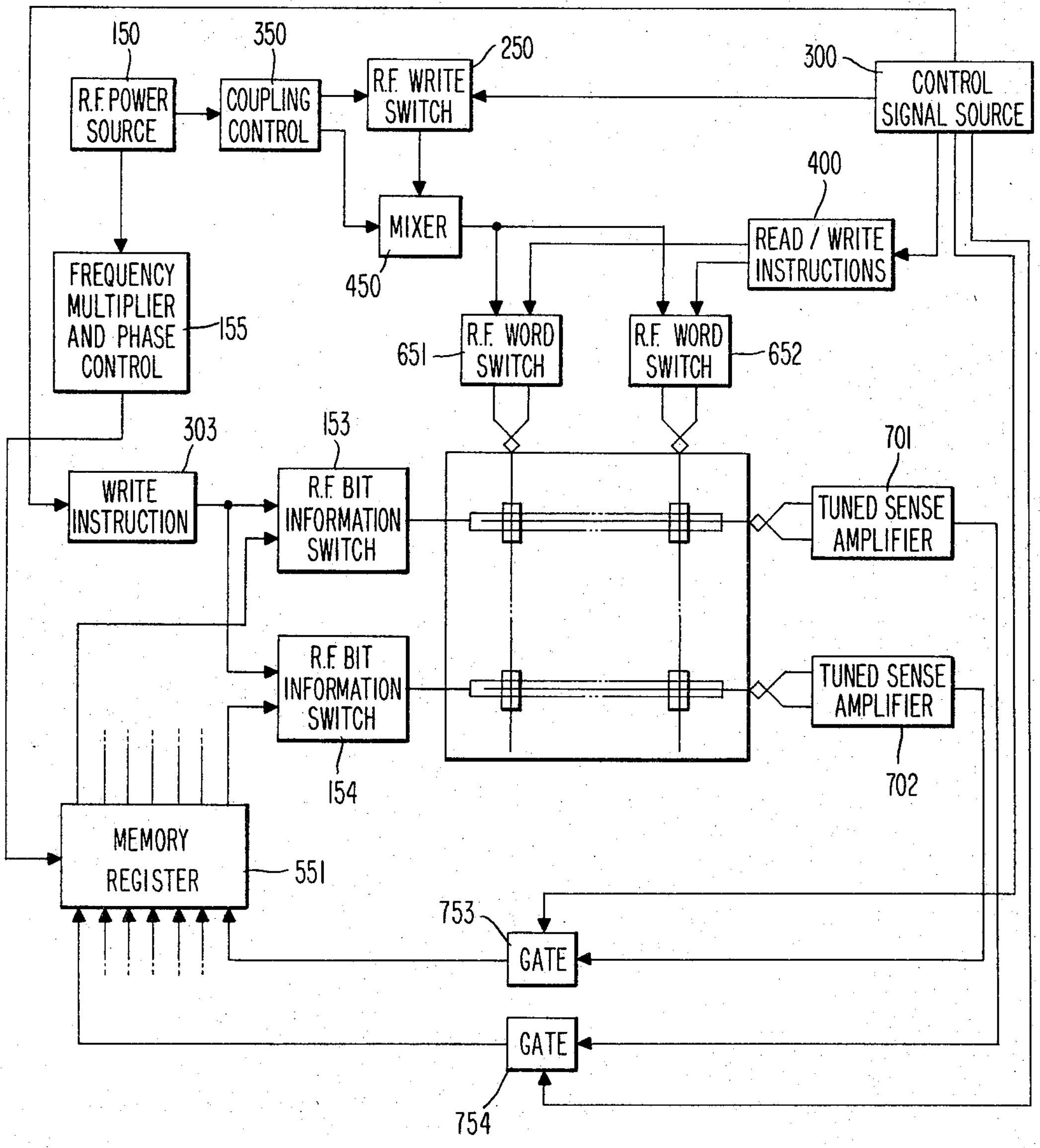
FIG. 5 illustrates a modification of the data store of FIG. 4.

Before describing the representative system organizations of FIGS. 3, 4 and 5, the waveform diagram of FIG. 2 which illustrates in a highly idealized manner, the waveforms associated with the mode of writing information into an element and reading it out nondestructively, will be considered. The relative phase of the waveforms is also shown. Reference should also be made to FIG. 1 which depicts a film element and its associated conductors.

It will be assumed that it is desired to cause element 22 of FIG. 1 to be magnetized in the (+) state, which will arbitrarily represent the storage of a binary "1." Further, it is assumed that element 22 is demagnetized with domains alternately residing in the (+) and (−) states.

At time $t_1$, a strong radio-frequency transverse drive field $H_{T1}$ of frequency "*f*" is applied to element 22 by means of current flow through conductor 24. The amplitude of the $H_{T1}$ field is sufficient to cause destruction of the stored information and a wide range of magnetic dipoles experience rotations approaching 90° in response to this field. At time $t_1$, a comparatively weak parallel or longitudinal field $H_L$, is applied to element 22 as a result of current flow through conductor 26. This latter field which supplies the information bias for appropriate write action may be a radio-frequency field $H_{L(RF)}$ at twice the frequency, "2*f*" of the transverse drive field $H_{T1}$ and phased at plus or minus 90° with respect to that field in time, depending respectively upon whether a "1" or a "0" is to be stored. Alternatively, the parallel information field may be a direct current (DC) pulse field, $H_{L(DC)}$ with a positive or negative direction along the easy axis depending upon the nature of the information being written. The foregoing variations in the generation of the longitudinal information field are illustrated in FIG. 2. It is assumed that either $H_{L(RF)}$ phased at plus 90° in time with respect to $H_{T1}$, *or* $+H_{L(DC)}$ is required to store a "1."

In either case at time $t_2$, $H_{T1}$ terminates and $H_L$ is maintained at least until the $H_{T1}$ field has been reduced to a nondestructive level. At time $t_2$, substantially all of the magnetic dipoles acting as a single large domain rotate to the (+) state. Thus the resultant combination of the destructive transverse drive and the easy direction information drive causes the magnetization vector to switch to the desired position along the preferred axis, as determined only by the nature of the information drive. The storage, or writing, of a binary "1" into element 22 has been accomplished approximately between times $t_1$ and $t_2$. The flux changes created by the rotation of the magnetic dipoles when the fields are applied or removed, result in sense signals being induced in a sense conductor, such as conductor 28 of FIG. 1. However, only those signals induced in the sense conductor during read-out are considered pertinent to the present discussion and these are illustrated in FIG. 2.

Successive read-outs or interrogations of the magnetic element are illustrated as occurring during the period $t_3$–$t_6$, and are accomplished by the application of successive radio-frequency interrogate fields, designated $H_{T2}$ to the element. This interrogate field has an amplitude considerably less than that of the $H_{T1}$ field used in storing information.

Each time $H_{T2}$ is applied to the element, for example at times $t_3$ to $t_4$ and $t_5$ to $t_6$, the magnetic dipoles of element 22 will experience a sinusoidal displacement from the preferred axis and a sinusoidal voltage of twice the frequency of the alternating $H_{T2}$ field and phased either + or −90° therefrom will be induced in sense conductor 28. As mentioned previously, the phases of the output signals with respect to each other will be 180 degrees apart, representing the binary information read out of the element. The interrogation pulse $H_{T2}$ may be repeated indefinitely without permanently affecting the information stored in the element.

Approximately between the times $t_7$ and $t_8$, the binary "1" stored in the element is read out destructively, and a binary "0" is written into the element. This is accomplished by applying a strong transverse RF field $H_{T1}$ at time $t_7$, and either $H_{L(RF)}$ phased at −90° in time with respect to $H_{T1}$, or alternatively $-H_{L(DC)}$, at time $t_{7'}$. $H_{T1}$ rotates the magnetic dipoles sinusoidally in a transverse direction and the $H_{L(RF)}$ or $-H_{L(DC)}$ fields exert a force on these dipoles which causes substantially all of them to rotate to the (−) state upon the termination of the $H_{T1}$ field at $t_8$ time.

As in the case of interrogation when the element was in the (+) state, repeated $H_{T2}$ pulses will cause a useful output signal to be generated in sense line 28 without destroying the stored binary "0." It will be noted in FIG. 2 that the output signal for the read-out of a binary "0" is 180° out of phase with the signal representative of a binary "1," and twice the frequency of the $H_{T2}$ field. The RF signals induced in the sense conductor for repeated $H_{T2}$ fields, appear at times $t_9$ to $t_{10}$ and $t_{11}$ to $t_{12}$ in FIG. 2.

FIG. 3 depicts twelve film elements with conductor assemblies similar to the one assembly shown in FIG. 1, and auxiliary equipment connected to illustrate the use of the present invention as a data store. Only the elements in the first word have been numbered respectively 221, 222 and 223, since a consideration of these elements will suffice in the explanation of the operation of the data store. Likewise only the transverse drive conductor for "word 1" has been designated by a reference numeral, namely 241. The parallel drive conductors for bits 1, 2 and 3 are designated respectively 261, 262 and 263; the sense conductors for each of the bits are designated 281, for "bit 1," 282 for "bit 2" and 283 for "bit 3." As the reader has probably noted, the first two numbers of each of the items, both magnetic elements and conductors in FIG. 3, have been chosen to correspond with like items in FIG. 1, the third number being indicative of their position in the array. The preferred direction of magnetization of each of the elements in the array is vertical as indicated by the arrows 30, and lies within the plane of the paper.

The parallel drive and sense conductors, 261, 281, respectively, are shown as returning to their sources by traversing the underside of the base or substrate 201. It should be understood that, although not shown in such detail, all of the other conductors are assumed to return in like manner.

Each sense conductor is connected to a transformer, or differential amplifier, in order to reject common-mode noise signals. Thus sense wires 281, 282 and 283 are connected respectively to the primary windings of transformers 601, 602 and 603. The secondaries of the transformers are connected respectively to sense amplifiers, 701, 702 and 703.

In electrical computing and data processing apparatus, it is conventional to achieve economy of apparatus by causing the same physical assemblies to perform functions as part of different logical entities at different times. For simplicity of explanation, rectangles or blocks are employed to represent assemblies of apparatus to perform specified electrical or logical operations. Various conventional methods and apparatus for performing these functions are well known to those skilled in the art of electronic data processing and computation.

Block 300 represents a source of control signals, which are applied selectively to various parts of the data store by channels represented as single lines, although they may be multiple conductors in some or all of the cases. For example, line 301 carries control signals from block 300 to a source of read-write instructions 400 and line 302, to a source of write instruction 303. The control signal source 300 will perform its directive or function in accordance with the logical requirements of the overall operation to be performed by the computing or analogous system which is to employ the present invention as a memory. The functions of the control signal source 300 will be specified only insofar as they relate to the practice of the present invention.

Assume that it is desired to record or write information into the memory and that such information has been stored in the memory register 500. The register 500 serves as a buffer between the input of information into the memory and output of information from the memory. As depicted in FIG. 3, the memory register 500 is shown as comprising three stages, i.e., it is capable of storing, at any one time, three bits of data. Information may enter the register from somewhere in the computer logic circuits or from a source external to the computer by way of lines 501, 502 and 503. Similarly, the information stored in the register at any time is available for use in such logic circuits or by an external utilization device by way of lines 901, 902 and 903.

It will be further assumed that the information to be written into the memory is the binary number "101," and that it is to be written into the memory as "word 1." The control signal source 300 applies by way of line 301 two command pulses to the read-write instructions block 400 in order to implement the write cycle, together with a third pulse representative of the address instruction. The transverse field selection matrix 600 which, depending upon the particular application, may include either a diode, transformer or transistor matrix, senses the address which is stored in the read-write instructions block 400. In the present example, the selection matrix 600 selects "word 1" in order that the bits of information stored in the memory register 500 can be written respectively into the three storage elements 221, 222 and 223.

Reference to FIG. 2 will indicate the timing sequence for the application of fields to the storage elements for writing and reading a binary "1" and a binary "0."

With reference to the pulse diagram of FIG. 2, at time $t_1$, the selection matrix 600 senses the first half of the write instruction from the instructions block 400 and causes a high level radio-frequency transverse drive current from a source thereof (not shown), to flow through conductor 241, thereby generating the $H_{T1}$ field which is applied to the magnetic elements. At a later time $t_{1'}$, the control source 300 pulses the write instruction block 303 by way of line 302. Each of the information field circuits 101, 102 and 103 constantly sense the information in their respective bit positions in the memory register 500 by means of lines 401, 402 and 403. The reception of a signal by the write instruction block 303 from the control source 300, directs by way of line 304 all of the information circuits to supply write current simultaneously. If the particular circuit senses a "1" in the memory register to be written into the memory, and the circuit is of the pulse driver type, the driver will supply a positive pulse at time $t_{1'}$, for generating the $+H_L$ field, as shown at $t_{1'}$ in FIG. 2. On the other hand, if the information circuit senses a "0" it will cause a negative pulse to be generated for $-H_L$ at $t_{1'}$, as shown at $t_{7'}$ in FIG. 2.

Alternatively, if the $H_L$ field is generated by RF current derived from the same source as the $H_T$ fields, but at twice the frequency thereof, the information circuits include RF switches for the respective bits. The RF switches are each interposed between the memory register and a parallel drive conductor. As will be considered hereinafter in connection with FIG. 5, the memory register may conveniently be of the parametron type and the phase-script signals appearing respectively on the input terminals of the RF switches are indicative of the binary information stored in the register. The reception of a command by the write instruction block 303 from the control signal source 300, directs by way of a signal on line 304, the closing of said RF switches. If a "1" is to be written into the memory, an RF current of twice the frequency of the $H_T$ current and phased at $+90°$ in time with respect to the latter current, as shown at time $t_{1'}$ in FIG. 2, is applied to the appropriate parallel drive conductors. On the other hand, if the switch actuated is associated with a stored "0" in the memory register, a burst of RF current at twice the frequency of the $H_T$ current, and $-90°$ out of phase with $H_T$, will be applied to the parallel drive conductor, as shown at time $t_{7'}$ in FIG. 2.

In the present example it will be assumed that the information circuit 101 for bit 1 comprises a pulse driver for applying a positive pulse of current to the parallel drive conductor 261 for generating $+H_L$ at time $t_{1'}$; circuit 102 will apply a negative pulse, for $-H_L$, to conductor 262; circuit 103, a positive pulse to conductor 263.

At time $t_2$ selection matrix 600 terminates the high level transverse current, and shortly afterward the information driver pulses terminate. The writing cycle is now complete—"word 1" of the memory now stores a "1" as bit 1, "0" for bit 2, and "1" for bit 3.

To read the information out of the memory at time $t_3$, the control source 300 sends two commands to the read-write instructions block 400, one for the address, the other to read. Assuming that the address is still for "word 1," the RF transverse field selection matrix 600 senses the instruction stores in block 400, and causes low level radio-frequency current to flow through drive conductor 241, in order to produce the $H_{T2}$ field, and the information in magnetic elements 221, 222 and 223 is read out nondestructively as hereinbefore described in connection with FIG. 2.

As a result of the reading operation, bursts of radio-frequency sinusoidal signals having twice the frequency of the transverse interrogate current and phased either $+$ or $-90°$ in time therefrom will appear respectively on the sense lines 281, 282 and 283. In accordance with FIG. 2 and the phase conventions arbitrarily established, the signals on lines 281 and 283, representative of the binary "1," and the signals on line 282 for a binary "0," are 180 degrees out of phase with each other. The signals on sense lines 281, 282 and 283 are coupled respectively by transformers 601, 602 and 603 into tuned sense amplifiers 701, 702 and 703. It should be noted that in a practical working system, the transformers and sense amplifiers may be a unitary device. The outputs of the sense amplifiers are fed in parallel to the appropriate locations in the memory register 500 by way of lines 801, 802 and 803, where the information is stored and may be utilized by either the computer logic circuits or an external utilization device. The latter statement assumes that the register is of a type capable of directly storing phase-script information—for example, that it is of the parametric type. If this is not the case the RF signals from the sense amplifiers may be applied respectively to phase detectors, having a DC output level corresponding to the phase of the input signal. The pulse outputs of the phase detectors are then applied to the elements of the memory register and are of the proper character to effect suitable storage of the information.

Information may now be written into "word 2" and "word 3" of the memory by inserting the desired information in the memory register and initiating the write instructions as hereinbefore described. New information may also be written into "word 1" in the same manner, in which case the information stored by the previous write cycle is destroyed by the new write cycle. As new information is stored in the memory register 500 by either the computer logic circuits or the sense amplifiers, the information previously stored therein is destroyed and only the new information remains.

In the specific organization of a nondestructive memory in accordance with the present invention, as depicted in FIG. 4, like reference numerals have been used to designate those items having counterparts in FIG. 3. For the sake of clarity, only four of the usual large number of thin film storage elements have been shown in the memory plane. The arrangement of conductors with respect to the thin film elements is identical to that of FIG. 1.

Figure 6:
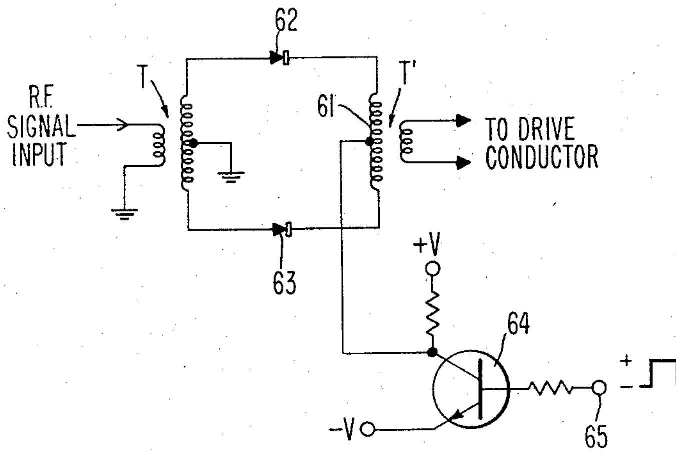
FIG. 6 is a schematic diagram of a radio-frequency switching circuit suitable for use in the data stores of FIGS. 4 and 5.

A single source of RF power, designated 150 supplies the radio-frequency drive current for the word lines. Each word line has associated with an RF word switch such as 651, and 652 which may include a magnetic transfer loop and transistor switch as illustrated in FIG. 6 and described hereinafter. On the other hand, in the embodiment of FIG. 4, the information circuits are pulse drivers, such as 151 and 152, supplying upon command and in accordance with the information stored in the memory register, either a positive or a negative pulse of current.

In operation, for the write cycle, the control signal source 300 sends a write command to the RF write switch 250 together with commands to the read-write instructions block 400, including an address instruction. Under steady state conditions, the RF power source 150 supplies RF read current by way of the coupling control 350 and transformer mixer 450 to all of the input terminals of the RF word switches such as 651 and 652 in parallel. The amplitude of this RF signal is sufficient to produce the $H_{T2}$ interrogation field employed during the read cycle. However, during the write cycle, it is necessary to increase the amplitude of this RF read current to a level sufficient to produce the $H_{T1}$ field needed for writing or storing information. The command from the control signal source 300 to the RF write switch 250 accomplishes this by allowing the level of the RF current present on the input terminal of the RF write switch to be superimposed by means of transformer mixer 450 on the read current level. The resultant high level RF current then appears on the input terminals of all of the RF word switches.

In accordance with the write instruction from block 400, a particular word switch in the memory is selected and the high level RF current is applied to all of the film elements comprising the selected word. Shortly after the establishment of the destructive $H_{T1}$ field in the selected word, the control signal source actuates the write instruction block 303. Each of the pulse information drivers 151 and 152 continuously senses the information in its respective bit position in the memory register 550. The reception of a pulse by the write instruction block 303 from the control signal source, causes all of the information drivers to write simultaneously. As previously explained in connection with FIG. 3, each information driver will supply either a positive or a negative pulse of current to the information conductor associated therewith, depending upon whether a "1" or a "0" is to be stored in the memory. Thus the information pulses provide the $H_L$ longitudinal field utilized in the write operation. At a still later time, the control signal source terminates the high level RF transverse drive current, and shortly afterwards the information driver pulses terminate. The write operation has now been completed.

During the read operation, the control signal source 300 through the read/write instructions block 400, causes the RF read current present at the input terminals of the RF word switches 651 and 652 to be applied to a selected word. As a result all the bits of the selected word experience the same radio-frequency drive, and thus provide simultaneous sense information on the sense conductors. The RF output signals appearing on the sense conductors are twice the frequency of the RF source 150, and have a phase indicative of the information stored respectively in the bits of the selected word. The output signals are applied to the tuned sense amplifiers 701, 702 and 703. If it is assumed that the memory register depicted in FIG. 4 is of the nonparametric type, the phase script signals from the sense amplifiers must be converted to pulse-type information before being fed back to the register. Therefore, the outputs of each of the sense amplifiers are shown as being coupled respectively to an input terminal of phase detectors 751 and 752. Another input terminal of the phase detectors is coupled to the RF power source 150 by way of a frequency doubler 850. The latter input serves as a phase reference. The outputs of the phase detectors are coupled through gates 753 and 754 respectively to the memory register, where the information is stored. Gates 753 and 754 are under control of the signal source 300 and allow signals to pass to the memory register only during read-out of the storage elements.

The data store illustrated in FIG. 5, represents a modification of the system of FIG. 4. It should be noted that the word drive portion of FIG. 4 is substantially the same as that of FIG. 5. Specifically in FIG. 5, the DC pulse drivers used to develop $\pm H_L$ have been replaced by RF bit information switches such as 153 and 154, similar in circuit configuration to the RF word switches 651 and 652. The memory register 551 utilizes parametron stages which are driven, after appropriate frequency multiplication and phase adjustment in multiplier and phase control 155, by the RF power amplifier source 150. The drive or pump frequency is chosen to be four times the frequency of the F power source in order that the parametric oscillations of the stages will be at twice the frequency of the RF source. Each of the RF information switches is coupled either directly or if necessary, by power amplifier means, (not illustrated) to its associated stage in the register. The phase control portion of block 155 allows a phase adjustment such that the phase script information in the memory register which is sensed by the respective RF bit information switches and is coupled thereby into the parallel drive conductors, has the required + or −90° phase shift with respect to the RF current in the tranverse drive conductors.

During the write operation, the RF drive signals appearing on the input terminals of the respective RF information switches are gated by means of the write instruction block 303 through the information conductors in response to signals provided by the control signal source 300.

During interrogation, the sense signals induced in the sense conductors are amplified by tuned sense amplifiers 701 and 702 and are applied by way of gates 753 and 754 to the memory register. The phase detectors 751 and 752 utilized in the system of FIG. 4 are not required since the parametron register 551 is capable of receiving and storing the phase-script information.

FIG. 6 illustrates a simple RF switch which may be employed as the RF Word Switch (designated 651 and 652 in FIGS. 4 and 5).

The RF signal to be transferred to the appropriate drive conductor is coupled by input transformer T into a circuit comprising an output transformer T′ having a center-tapped winding 61. A pair of diodes are connected respectively on opposite sides of the center-tap. The diodes are poled such that the application of a positive potential of suitable amplitude to the center tap of winding 61 of transformer T′ will reverse bias both diodes, thereby preventing the RF signal from transformer T to be coupled into the output transformer T′. On the other hand, if the potential on the center tap of winding 61 is negative so that the diodes are forward biased, the RF signal will be transferred to T′, and will be applied to the drive conductor coupled to transformer T′.

Transistor 64, under direction of the control signal source 300, supplies the bias voltage for diodes 62 and 63. Thus with a negative potential applied to terminal 65, which is coupled to the base of transistor 64, the transistor is nonconductive and the collector electrode, as well as the center tap of winding 61 to which it is connected, is at a positive potential. Diodes 62 and 63 are reverse biased. When the control signal source 300 causes a positive voltage pulse to be applied to terminal 65, the transistor 64 conducts, and a negative potential is applied to the cathodes of the diodes thereby forward biasing the diodes to conduction.

It must be emphasized that the circuit configuration of FIG. 6 for an RF switch as required in FIGS. 4 and 5 is included solely for purpose of example. Numerous other circuit configurations well known to those skilled in the art, could be employed with satisfactory results. Accordingly, the present invention should in no way be considered limited to the use of the RF switch described herein.

It will be apparent from the foregoing description of the invention and its mode of operation that there is provided an improved thin magnetic film memory capable of being read out nondestructively through the use of a radio-frequency interrogation field. It should be understood that modifications of the arrangements described herein may be required to fit particular operating requirements. These will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A data store comprising a plurality of thin ferromagnetic storage elements arranged in rows and columns, said elements being capable of attaining opposed states of residual flux density along a preferred axis of magnetization, a column-driving conductor for each column inductively coupled to all of the storage elements in the column and substantially aligned with said preferred axis of magnetization, a row-driving conductor for each row inductively coupled to all of the storage elements in the row and substantially oriented at right angles to said preferred axis of magnetization, means for applying a radio-frequency driving current to the column conductor of a selected column so as to apply a first radio-frequency transverse magnetizing field to all of the storage elements in said selected column, means for applying to each row conductor a driving current so as to apply to all of the elements coupled thereto a first parallel magnetizing field, said first radio-frequency transverse field and said first parallel field being present in at least partial coincidence, substantially all of the magnetic dipoles of each of the storage elements in said selected column being rotated to the state of residual flux density determined by said first parallel magnetizing field, and means for nondestructively interrogating the state of each of the elements in said selected column including the column conductor of said selected column for applying a second radio-frequency transverse magnetizing field to each of the storage elements in said selected column, said second radio-frequency magnetizing field being controlled in magnitude so as to cause rotations of the magnetic dipoles in each of the last mentioned storage elements which disturb but do not switch the state of these elements.

2. A data store as defined in claim 1 further characterized in that said means for nondestructively interrogating the state of each of the storage elements in said selected column, also comprises a plurality of sense conductors inductively coupled to respective rows of said storage elements and oriented at right angles to said preferred axis of magnetization, said rotations of magnetic dipoles of the storage elements of said selected column in response to said second radio-frequency transverse magnetizing field causing sense signals of twice the frequency of said second transverse magnetizing field to be induced in said sense conductors, the sense signals corresponding to interrogated storage elements having opposed states of residual flux density being 180° out of phase with each other, and means for utilizing the sense signals induced in said sense conductors.

3. A data store as defined in claim 2 wherein said means for utilizing the sense signals induced in said sense conductors comprise amplifier means associated respectively with each of said sense conductors and tuned to the frequency of said sense signals, each of said amplifier means being operatively connected to each of said sense conductors for amplifying the sense signals appearing thereon during interrogation, phase detector means associated respectively with each of said amplifier means and having a pair of input terminals and an output terminal, one of said input terminals of each of said phase detector means being connected to the amplifier means associated therewith, the other of said input terminals of each of said phase detector means being connected in common to a phase reference, the voltage level appearing on the output terminal of each of said phase detector means being a function of the phase of theamplified sense signals relative to said phase reference and being representative of the binary information stored in the storage elements of said selected column at the time of interrogation, and a memory register coupled in common to all of the output terminals of said phase detector means for storing the binary information read out of said last mentioned storage elements.

4. A data store as defined in claim 1 wherein said means for applying to each row conductor driving current includes a pulse driver for supplying said driving current in the form of a unidirectional pulse having a predetermined polarity and duration.

5. A data store as defined in claim 1 wherein said means for applying to each row conductor driving current includes a radio-frequency power source for supplying said driving current in the form of a burst of sinusoidal radio-frequency current of predetermined phase relative to said radio-frequency driving current applied to the column conductor of said selected column.

6. A data store comprising, in combination, a thin film memory array including rows and columns of discrete thin ferromagnetic film storage elements, said elements being capable of attaining opposed states of residual flux density along a preferred axis of magnetization, a plurality of transverse-drive column conductors coupled to the storage elements of respective ones of said columns and substantially aligned with said preferred axis of magnetization, a plurality of row conductors coupled to the storage elements of respective ones of said rows and substantially oriented at right angles to said preferred axis of magnetization, said plurality of row conductors including respective pluralities of parallel-drive conductors and sense conductors, transverse field selection means connected to said plurality of column conductors, information current means connected to said parallel drive conductors, sense amplifier means connected to said sense conductors, a source of radio-frequency current, control signal means, said control signal means being operatively connected to enable said transverse field selection means to provide radio-frequency current flow derived from said source thereof through a selected one of said column conductors thereby applying a first radio-frequency transverse magnetizing field to the storage elements in said selected column, said control signal means concurrently causing said information circuit means to provide current flow through said row conductors thereby applying to the row elements coupled thereto a first parallel magnetizing field, the respective predetermined states attained by the storage elements situated in said selected column upon the cessation of said first radio-frequency transverse magnetizing field being a function of said first parallel magnetizing field, interrogation means for reading out nondestructively each of the storage elements in said selected column comprising said control signal means operatively connected to enable said transverse field selection means to provide radio-frequency current flow through said selected column conductor thereby causing a second radio-frequency transverse magnetizing field to be applied to the storage elements in said selected column, said second radio-frequency magnetizing field being magtrolled in magnitude so as to cause rotations of the magnetic dipoles in each of the last mentioned storage elements which disturb but do not switch the state of these elements.

7. A data store as defined in claim 6 wherein said information circuit means includes a pulse driver, said current flow provided by said information circuit means being in the form of a unidirectional pulse of current having a predetermined polarity and duration.

8. A data store as defined in claim 6 further including a memory register, gate means under the direction of said control signal source and operatively connected for coupling the output signals from said sense amplifiers to said memory register, said memory register being further adapted to receive input information signals from a source other than said sense amplifiers, said memory register being connected to said information circuit means, the information stored in said register determining the nature of the current supplied to said parallel drive conductors by said information circuit means.

9. A data store as defined in claim 6 wherein said information circuit means includes a radio-frequency switch, said current flow provided by said information circuit means being in the form of a sinusoidal radio-frequency current derived from said source thereof and having a predetermined phase relative to the radio-frequency current which generates said first radio-frequency transverse magnetizing field.

10. A data store as defined in claim 9 further characterized in that said radio-frequency switch for transferring radio-frequency signals from a source thereof to an appropriate drive conductor comprises a magnetic transfer loop and a transistor, said transfer loop including an input transformer having a first and a second winding, said first winding of said input transformer being adapted to receive the radio-frequency signals to be transferred to said drive conductor, said second winding of said input transformer having outer terminals and a center-tap terminal, said center tap terminal being connected to a source of reference potential, an output transformer having a first and a second winding, said first winding of said output transformer having a pair of outer terminals and a center-tap terminal, a pair of diodes coupling respectively the outer terminals of said second winding of said input transformer to the outer terminals of said first winding of said output transformer, said center-tap terminal of said output transformer being operatively connected to said transistor whereby the state of conduction of said transistor determines the bias voltage applied to said pair of diodes, means under the direction of said control signal source for establishing at predetermined times a state of conduction of said transistor such that said diodes are forward biased, thereby allowing said radio-frequency input signal to appear across said first winding of said output transformer, said second winding of said output transformer being connected to said drive conductor for coupling said radio-frequency signal into said last mentioned conductor.

References Cited

UNITED STATES PATENTS

| | | | |
|---|---|---|---|
| 3,252,152 | 5/1966 | Davis et al. | 340—174 |
| 3,276,001 | 9/1966 | Crafts | 340—174 |
| 3,341,830 | 9/1967 | Conrath | 340—174 |
| 3,116,475 | 12/1963 | Oshima et al. | 340—174 |

STANLEY M. URYNOWICZ, *Primary Examiner.*

U.S. Cl. X.R.

307—88

UNITED STATES PATENT OFFICE

CERTIFICATE OF CORRECTION

Patent No. 3,418,645 December 24, 19

Richard L. Fussell

It is certified that error appears in the above identified patent and that said Letters Patent are hereby corrected as shown below:

In the heading to the printed specification, lines 6 and 7, "a corporation of Delaware" should read -- a corporation of Michigan --. Column 3, line 31, cancel "film elements in which the functions of non-destructive" and insert the same after line 33, same column 3. Column 10, line 21, "F" should read -- RF --. Column 12, line 70, "mag-" should read -- con- --.

Signed and sealed this 17th day of March 1970.

(SEAL)
Attest:

Edward M. Fletcher, Jr.
Attesting Officer

WILLIAM E. SCHUYLER, JR.
Commissioner of Patents